United States Patent Office 3,487,030
Patented Dec. 30, 1969

3,487,030
SELF-EXTINGUISHING POLYURETHANE MOULDINGS
Hans Eberhard Praetzel, Bensberg-Frankenforst, and Herbert Jenkner, Cologne-Deutz, Germany, assignors to Chemische Fabrik Kalk G.m.b.H., Cologne-Kalk, Germany
No Drawing. Continuation-in-part of application Ser. No. 575,236, Aug. 26, 1966. This application Oct. 4, 1966, Ser. No. 584,091
Int. Cl. C08g 41/04; C09k 3/28
U.S. Cl. 260—2.5    4 Claims

ABSTRACT OF THE DISCLOSURE

Self-extinguishing polyurethanes are obtained by incorporating into the reaction mixture from which the polyurethanes are formed (A) 2 to 15 wt. percent of bromine in the form of a finely particulate polymer having a bromine content of at least 40 wt. percent selected from the group consisting of polyvinyl bromide, nucleus-brominated polystyrenes and mixtures thereof in a uniformly distributed state and (B) 0.1 to 5 wt. percent of phosphorus in the form of a condensable phosphorus containing diol selected from the group consisting of
(a) a compound of the formula

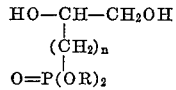

(b) a polymer of the compound (a) and
(c) mixtures thereof
wherein each R is a radical selected from the group consisting of methyl, ethyl, propyl, isopropyl, butyl, isobutyl, cyclopentyl, cyclohexyl, phenyl, toluyl and benzyl and $n$ is an integer from 1 to 24 and allowing the resulting mixture to react to a polyurethane.

---

This is a continuation-in-part of application Ser. No. 575,236, filed Aug. 26, 1966, now abandoned.

The invention relates to a process for the preparation of self-extinguishing polyurethane mouldings.

It is known to prepare polyurethane mouldings by setting moulding materials which contain polyfunctional isocyanates, polyesters or polyethers with free hydroxyl groups and catalysts. If these materials are set in the presence of expanding agents polyurethane foams will be formed. The resulting polyurethane mouldings cannot be applied to many industrial purposes since they are readily inflammable. It is also known that the combustibility of polyurethane mouldings is reduced if the mouldings comprise halogen-containing and/or phosphorus-containing compounds.

The known methods of flame-proofing polyurethane mouldings chiefly make use of halogen-containing compounds comprising groups which react with isocyanates. Examples of flame-protective components of this type are Diels-Alder adducts which are miscible with polyesters, are formed by the addition of polyhydric unsaturated alcohols or multivalent unsaturated carboxylic acids to hexachlorocyclopentadiene and contain free hydroxyl and/or carboxyl groups. Polyesters produced, for example, on the basis of tetrachlorophthalic or dibromosuccinic acid are also suitable. The importance of such processes is, however, declining, for the tendency is to make more and more use of polyethers with free hydroxyl groups to form polyurethane mouldings. Halogen-containing polyethers may be produced by reacting halogen-free dialcohols or diphenols with epichlorohydrin or dichlorohydrin. In the preparation of the various polyethers that are suitable for flame-proof hard or soft polyurethane foams, difficulties are experienced in adjusting the halogen content and the hydroxyl number to one another. In another process, it is proposed to add pentabromodiphenylether to the polyurethane-forming mixture as a flame-protective component which is inert in relation to isocyanates. But aromatically bonded halogen is released only at higher flame temperatures, so a polyurethane which is flame-proofed in this way will give only poor protection from flames in low-temperature fires.

If the halogen compounds are the only flame-protective components used, large quantities of them must be present in the polyurethane moulding if adequate protection is to be given. Yet in polyurethane mouldings a high halogen content has a bad effect on the physical and mechanical properties.

These unfavourable consequences may be at least partially avoided by adding to the polyurethane-forming mixtures organic phosphorus compounds, either alone or together with organically bonded halogen. Esters of phosphoric or phosphorous acid possibly containing halogen, such as tris-(dibromopropyl)-phosphate, are suitable for the purpose. Phosphorus compounds of low molecular weight, which cannot be built into the macromolecule by chemical reaction, have a tendency to migrate from the inside of the polyurethane moulding to the surface thereof, where they are removed by mechanical action. In this way the moulding loses its flame-proof properties after some time, even under normal conditions. It is therefore an advantage to use esters of phosphoric acid which can react with hydroxyl groups or with isocyanate groups, for example, hydroxyl-group-containing polyethers in which the free hydroxyl groups have been partially esterified with phosphoric acid, or hydroxyalkylesters of phosphoric or phosphorous acid such as phenylphosphonic acid bis-(β-oxyalkyl) esters or 2-bromethyl phosphoric acid diglycol esters. It is also possible to employ polyesters containing hydroxyl and phosphoric acid groups and prepared, for example, by alcoholysis of trialkyl phosphites with polyesters.

In order to give the polyurethanes adequate flame protection large quantities of the hydroxyl-group-containing polyethers and/or polyesters normally used must be replaced by reactive components containing halogen and/or phosphorus. As the amount of such substances added is increased, however, there is a marked deterioration in the mechanical and physical properties of the resultant polyurethane mouldings.

The reaction which takes place between isocyanates and hydroxyl-group-containing compounds to form polyurethanes is catalysed by amines such as triethylenediamine, N-benzyldimethylamine, N,N-diethylaniline or N,N-dimethylaniline. If the reaction is carried out in the presence of water the formation of polyurethane foams will be accompanied by the development of $CO_2$. Low boiling halogenated hydrocarbons which are soluble in or miscible with the polyurethane-forming mixture may be used as expanding agents instead of water. The catalysts accelerate the polyurethane-forming reactions and also serve to adjust to one another and control the various reactions which take place together within a very short period. If the quantities of halogen and/or phosphorus compounds which can be built into the polyurethane molecules are large, however, the processing safety of the polyurethane materials may suffer. In such cases the composition of the mixtures may have to be varied in order to obtain a well set moulding.

A search has therefore been made for methods of producing flame-proof polyurethane mouldings which avoid the above drawbacks.

A process has been discovered for preparing self-extinguishing, possibly foamed mouldings by setting moulding materials which, in addition to polyesters and/or polyethers with free hydroxyl groups, polyfunctional isocyanates, ordinary catalysts and additives, contain as the flame-protective component—in relation to the polyurethane-foaming component—2 to 15% by weight, preferably 2 to 9%, bromine in the form of organic bromine compounds and 0.1 to 5.0% by weight, preferably 0.5 to 2.5%, phosphorus in the form of condensable organic phosphorus compounds, and which may further contain expanding agents. By this process fine-particle polymers of the type of polyvinyl bromide or of nucleus-brominated polystyrenes with a bromine content of at leact 40% by weight are uniformly distributed in the moulding materials to form the organic halogen compound.

Thus, there is provided a self-extinguishing polyurethane having incorporated therein 2 to 15% by weight of bromine in the form of a finely particulate polymer selected from the group consisting of polyvinyl bromide, nucleus-brominated polystyrenes and mixtures thereof, said finely particulate polymer having a bromine content of at least 40% by weight and being uniformly distributed in said polyurethane and 0.1 to 5% by weight of phosphorus in the form of at least one condensable organic phosphorus compound.

All polyfunctional isocyanates normally used to produce polyurethanes, and particularly arylene diisocyanates such as toluidene diisocyanate or poly-(methylenephenyl)-isocyanate, are suitable for carrying out the method of the invention. Any polyesters and polyethers containing free hydroxyl groups may be employed as the additional components required to form polyurethanes. Such polyesters are for example: adipic acid diethylene glycol polyesters with a hydroxyl number between 35 and 45 for soft polyurethane foams and mouldings; a copolyester with a hydroxyl number between 350 and 390 from adipic acid, phthalic acid and a triol, or a copolyester with a hydroxyl number between 305 and 325 for hard polyurethane foams and mouldings. Examples for polyethers are: addition products of propylene oxide to a mixture of trimethylol propane and propylene glycol with a hydroxyl number between 53 and 59, addition products of propylene oxide to trimethylol propane with a hydroxyl number between 39 and 45, or addition products of propylene oxide to propylene glycol with a hydroxyl number between 53 and 59 for soft polyurethane foams and mouldings; addition products of propylene oxide to glycerine, sorbitol, pentaerythritol, trimethylol propane, α-methyl glucoside, or sucrose with hydroxyl numbers above 300 for hard polyurethane foams and mouldings. The catalysts, emulsifiers, expanding agents and foam stabilisers normally used for polyurethane production do not affect the working of the process according to the invention.

In accordance with the invention finely distributed bromine containing polymers are added to the polyurethane-forming mixtures so that the resultant moulding materials have a bromine content of 2 to 15% by weight, preferably 2.5 to 9.0% in relation to the polyurethane-forming components. The bromine-containing polymers used must contain at least 40% by weight of bromine. Materials which are particularly suitable are polyvinyl bromide and, among the polybromostyrenes, those which are obtained by polymerising a styrene in which the nucleus has been brominated 1 to 4 times. The fine-particle bromine-containing polymers mix well with the polyurethane moulding materials and can quickly and easily be distributed homogeneously therein. They may therefore be added to the polyurethane-forming mixture during the actual production of the moulding materials. Alternatively they may be homogeneously distributed in the polyesters and/or polyethers to form mixtures in which the bromine-containing polymers will not be deposited even after long storage. Such mixtures may be used to prepare the moulding materials.

In addition to the fine-particle bromine-containing polymers, condensible organic phosphorus compounds must be added to the mixtures for forming the polyurethane in quantities such that the resultant moulding materials have a phosphorus content of 0.1 to 5.0% by weight, preferably from 0.5 to 2.5%, in relation to the polyurethane-forming components. For this purpose organic phosphorus compounds containing at least two groups per molecule which are capable of reacting with isocyanates may be used. Examples of such compounds are neutral esters of phosphorus acid and of phosphinic, phosphonic and phosphoric acid, containing at least two hydroxy alkyl groups, such as tris(ethylene glycol)phosphite, tris(propylene glycol)phosphite, tris(ethylene glycol)phosphate, tris(polyethylene glycol)phosphate, phenylphosphonic acid bis(ethylene glycol ester), butylphosphonic acid bis(ethylene glycol ester). It is further proposed to use for this purpose polyethers containing hydroxyl groups and phosphorus and resulting from a reaction between bis-(hydroxyalkane)-phosphinic acid esters and epoxy compounds which can be prepared as described in our application corresponding to Ser. No. 515,165, filed Jan. 20, 1965, and phosphorus-containing diols of general Formula I or II

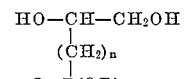

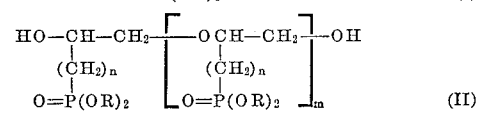

in which R stands for methyl, ethyl, propyl, isopropyl, butyl, isobutyl, cyclopentyl, cyclohexyl, phenyl, toluyl or benzyl, preferably methyl or ethyl, $n$ is a whole number from 1 to 24 and $m$ is a whole number between 1 and about 200. It will be appreciated that in the Formula II individual monomer units can be reversed. The production of the compounds of the general Formula II is described in our applications Ser. No. 509,221, filed Nov. 22, 1965, now abandoned, and 511,224, filed Jan. 2, 1965, and their use is described in our application Ser. No. 479,669, filed Aug. 13, 1965, now U.S. Patent No. 3,358,597.

The free hydroxyl groups of the condensable organic phophorus compounds react with the ioscyanates during the polyurethane-forming reaction, so that the phosphorus is chemically bonded into the macromolecules of the resultant polyaddition product. The phosphorus compounds are added to the polyurethane-forming mixture in the place of corresponding quantities of hydroxyl-group-containing polyesters and/or polyethers. The quantities of phosphorus compounds used and the quantities of polyesters and/or polyethers replaced thereby must agree or be almost equivalent in respect of their content of free hydroxyl groups.

In the method of the invention the fine particle bromine-containing polymers and the condensable organic phophorus compounds are introduced into the moulding materials which also contain polyesters and/or polyethers with free hydroxyl groups, polyfunctional isocyanates, ordinary catalysts such as tertiary amines, triethylene-diamine or stannous octoate, and additives such as Si-compounds containing hydroxyl groups. If the materials are to be used to produce foamed mouldings, expanding agents such as water or tricholormonofluoromethane must be added. If the moulding materials should contain other known flame-protective agents this will not disturb the working of the process according to the invention.

The moulding materials compounded according to the invention are then shaped, possibly with simultaneous foaming, and set in known manner at a raised temperature. The conditions under which they are set are virtually unchanged by the addition of the polymers and the small quantities of phosphorus compounds.

The method of the invention gives rise to self-extinguishing mouldings in which the bromine-containing polymers used as flame-protecting agents are present like a filler. Being compounds of high molecular weight, the polymers show no tendency to migrate, so the mouldings according to the invention are permanently flameproofed. The effectiveness of the flame-protective components to be added in accordance with the invention is shown by the fact that the self-extinguishing mouldings need preferably contain only 2.5 to 9% bromine and 0.5 to 2.5% phosphorus.

As the bromine-containing polymers are not involved in the build-up of the polyurethane molecules and the condensable phosphorus compounds are present only in minor amounts, mouldings made according to the invention have virtually the same mechanical and physical properties as mouldings which have been built up in the same way but not flameproofed.

The following examples describe the preparation of mouldings by the method of the invention and the testing of their burning behaviour. Particular attention is given to testing the burning behaviour of foamed mouldings since their larger surfaces makes them more easily inflammable and combustible than compact mouldings of the same composition.

The testing of burning behaviour mentioned in the examples was carried out in accordance with ASTM Specification No. 1692.

In this test samples 15.24 cm. long, 5.08 cm. wide and 1.27 cm. thick are sawed out of the material to be examined. The support for the sample bars during the experiment is a gauze 21.59 cm. long and 7.62 cm. wide of 0.8 mm. diameter steel wire, 1.27 cm. of which is bent upwards at 90° along a narrow side. The wire gauze is held by a clip in one corner of the upwardly bent narrow side and in the centre of the other narrow side. The sample is placed on the gauze so that its narrow side abuts the upwardly bent part of the latter so that it lies in the centre of the gauze. A Bunsen burner fitted with a 3.4 cm. wide fish tail nozzle is placed below the upwardly bent narrow side of the gauze. There must be a 1.27 cm. space between the gauze and the top of the burner nozzle. The burner must burn with a non-luminous flame 3.8 cm. high. Under these conditions the sample on the gauze is brought into contact with the flame for 30 seconds and the time taken by it to extinguish itself once the flame has been removed is measured.

EXAMPLE 1

7.0 parts by weight of a phosphorus-containing polyether produced from glycerine + glycidylphosphonic acid diethyl ester in molar ratio of 1:3 by heating to about 80° C. in presence of borontrifluoride and ethyl ether (14.2% by weight phosphorus, hydroxyl number 306), 7.0 parts poly-(tribromostyrene) (bromine content 70% by weight), 15.5 parts of a polyether produced from sorbitol + propylene oxide (hydroxyl number 425), 20.5 parts diphenyl methane diisocyanate, 13.0 parts monofluorotrichloromethane, 0.18 part triethylenediamine, 0.1 part N,N-diethylaniline, and 0.35 part polysiloxane, are foamed, the resultant hard polyurethane foam contains 8.5% by weight bromine and 1.9% phosphorus; on flame treatment in accordance with ASTM 1692 it extinguishes itself in less than one second.

EXAMPLE 2

3.3 parts by weight of a phosphorus-containing polyether produced from glycidylphosphonic acid diethyl ester (16.6% by weight phosphorus, hydroxyl number 70), 1.7 parts polyvinyl bromide (bromine content 75% by weight), 30.0 parts of a polyether produced from trimethylol propane, propylene glycol and propylene oxide (hydroxyl number 56), 13.3 parts toluidene diisocyanate, 0.2 part triethylene diamine, 0.1 part N,N-diethylaniline, 1.0 part water, and 0.2 part polysiloxane glycolester are foamed. The resultant soft polyurethane foam contains 2.70% by weight bromine and 1.2% phosphorus; after flame treatment in accordance with ASTM 1692 it is extinguished within 3 seconds.

We claim:
1. A self-extinguishing polyurethane produced by reaction of (A) a mixture of a hydroxyl-group terminated polymer (i) and a phosphorus-containing diol (ii) with (B) a polyisocyanate, the reaction mixture having admixed therein in a uniformly distributed state 2 to 15% by weight of bromine in the form of a finely particulate polymer having a bromine content of at least 40% by weight selected from the group consisting of polyvinyl bromide, nucleus-brominated polystyrenes and mixtures thereof, said hydroxyl-group terminated polymer (i) being selected from the group consisting of polyethers, polyesters and mixtures of polyethers and polyesters, and said phosphorus-containing diol (ii) being selected from the group consisting of
  (a) diol monomer of the formula

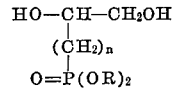

and
  (b) diol polymer of the formula

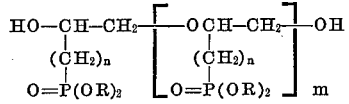

in which each R is a radical selected from the group consisting of methyl, ethyl, propyl, isopropyl, butyl, isobutyl, cyclopentyl, cyclohexyl, phenyl, toluyl and benzyl, $n$ is a whole number from 1 to 24 and $m$ is a whole number from 1 to about 200, and mixtures of diol monomer and polymer, and
  (c) mixtures of monomer (a) and polymer (b), said phosphorus-containing diol being combined in the polyurethane in a proportion sufficient to provide a phosphorus content therein of between 0.1 and 5% by weight.

2. The polyurethane of claim 1, wherein 2 to 9% by weight of bromine is present.

3. The polyurethane of claim 1, wherein 0.5 to 2.5% by weight of phosphorus is present.

4. The polyurethane of claim 1, which is foamed.

References Cited

UNITED STATES PATENTS

| | | | |
|---|---|---|---|
| 3,075,928 | 1/1963 | Lanham | 260—2.5 |
| 3,218,272 | 11/1965 | Nowlin et al. | 260—2.5 |
| 3,294,712 | 12/1966 | Clark et al. | 260—2.5 |
| 3,385,801 | 5/1968 | Birum et al. | 260—2.5 |

DONALD E. CZAJA, Primary Examiner

M. J. WELSH, Assistant Examiner

U.S. Cl. X.R.

260—75, 77.5, 859, 953